3,743,662
CATALYST FOR THE HYDROGENATION OF OILS
Jacobus J. M. G. Eurlings, Valkenburg, John W. Geus, Geleen, and Cornelis A. M. Weterings, Stein, Netherlands, assignors to Stamicarbon N.V., Heerlen, Netherlands
Filed May 28, 1970, Ser. No. 41,511
Claims priority, application Netherlands, Oct. 4, 1969, 6915061
Int. Cl. C11c 3/12
U.S. Cl. 260—409                    7 Claims

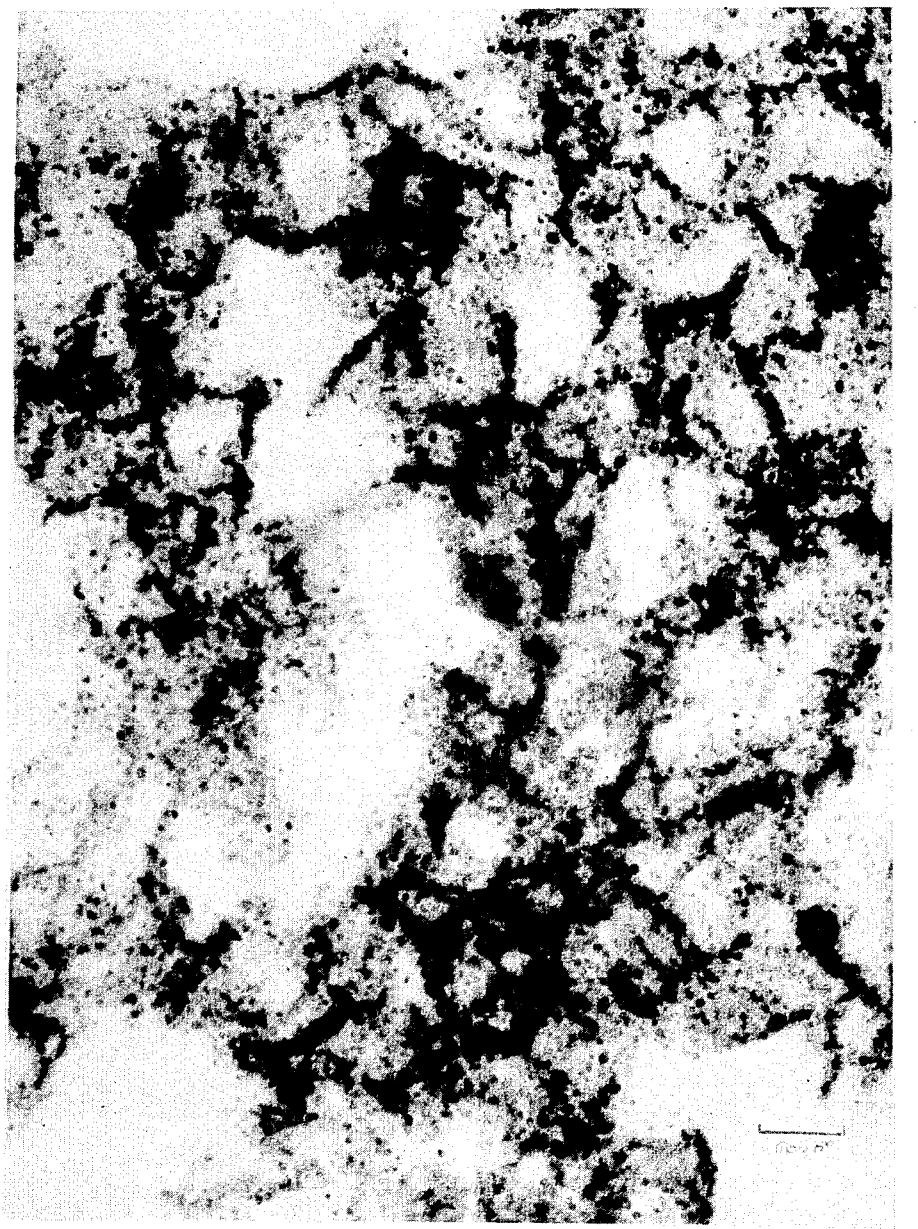

ABSTRACT OF THE DISCLOSURE

The present invention relates to a process of hydrogenating oil at elevated temperature, by means of a catalyst containing elementary copper and nickel on a thermostable carrier material. The catalyst is obtained in three separate steps; in the first step a homogeneous layer of hydrated nickel oxide is precipitated onto the thermostable carrier material, in the second step an insoluble copper compound is precipitated in homogeneous distribution onto the layer of hydrated nickel oxide, and in the third step the loaded carrier material is subjected to a reductive treatment at a temperature above 150° C.

BACKGROUND OF THE INVENTION

It is known that the use of oils which, in addition to linoleic acid, contain fatty acids with a higher degree of unsaturation, is limited, especially in the manufacture of edible products of good quality, because of a rapid deterioration in taste caused by the presence of too large an amount of linolenic acid. According to present views, however, edible products should contain sufficient linoleic acid. For this reason the hydrogenation is aimed at decreasing the linolenic acid content to 0–30% of the original value, while maintaining a linoleic acid content of at least 50–70% of the original value, a further aim being to reach an iodine number of 105–120.

Hydrogenation catalysts suited for the purpose are mainly catalysts containing copper, but these have the disadvantage of generally exhibiting rather low activity. Consequently the reaction requires considerable copper and a long time. To increase the activity, the copper is sometimes structurally combined with an activator, for instance nickel, platinum or palladium. However, the activity nevertheless remains considerably below that of the less selective nickel catalysts.

Unlike the more active nickel catalysts, the known catalysts showing a high selectivity for the hydrogenation of linolenic acid are not very active, so that elevated pressures have to be applied in the hydrogenation. Moreover, these catalysts show little thermostability; on account of this, the necessary reduction of at least part of the metal compounds to the metal almost inevitably involves sintering of the catalytically active particles. A condition of the preparation of catalysts showing a technically useful degree of activity is reduction under such mild conditions that part of the metal compound remains present in the unreduced form. Reduction under conditions in which the metal compounds present are completely converted to the metal form unavoidably results in a strong sintering of the catalytically active particles, and hence produces catalysts of low activity. Owing to the presence of a fraction of the copper compound in the unreduced condition, an appreciable amount of copper will be dissolved during the hydrogenation of the oils. The copper ions present in the form of copper soaps promote the oxidation of the unsaturated fatty acids, Moreover, for reasons of toxicology, the allowable copper concentration in the hydrogenated oil is only 0.1 p.p.m., so that a technically difficult purification must follow. Also, high demands are made on the hydrogenation catalysts as regards their filtration from the hydrogenated oil. In general, the catalysts prepared by coprecipitation or catalysts made from the corresponding metal formates lend themselves less readily to filtration. Finally, the catalytic properties of copper-containing catalysts made by the known techniques are not always well reproducible.

Before a more detailed specification of the invention is given, the prior state of the art in this field will now be described.

From the U.S. patent specification No. 3,278,568 it is known that oils containing linoleic acid in addition to linolenic acid in a ratio of 1.5 to 1 can be selectively hydrogenated with the aid of a catalyst based on copper compounds and/or compounds containing copper to the point where the linolenic acid content has dropped to less than 70% of the original value, while at least 40% of the linoleic acid originally present is retained. These catalysts can be prepared via coprecipitation of a reducible copper compound and a non-reducible compound, for instance via coprecipitation of copper salts and chromium salts, by impregnation of a non-reducible carrier with an aqueous solution of a copper salt, or via decomposition of an organic copper compound. Although the reduction of the catalyst may be done under the reaction conditions, it is preferable for practical reasons to subject the catalyst to the reductive action of hydrogen prior to use, under such conditions that no undue sintering will occur. These conditions are not specified; the reduction temperatures used are temperatures of around 200° C.

The use of organic copper compounds in the reduction or hydrogenation of organic compounds, especially of unsaturated fatty acids, is known already from the Netherlands patent specification No. 990 (of 1916), the use of copper particles obtained by reduction of copper carbonate for hydrogenating liquid fatty acids and related glycerides is known from the Netherlands patent specification No. 1800. The British patent specification No. 670,906 describes a copper catalyst consisting of—or reduced during the hydrogenation to—metallic copper and containing no activators. This catalyst is used for the selective hydrogenation of oils, fats or esters which contain oleic acid by the side of fatty acids of higher unsaturation, the latter being reduced to oleic acid, and the oleic acid already present not being hydrogenated. It is evident that stopping the hydrogenation prematurely will result in only part of the fatty acids of higher unsaturation being hydrogenated, and none or hardly any of the oleic acid being converted.

The copper-based catalysts are much less active than the nickel catalysts normally used in the hydrogenation of oils and fats. The British patent specification No. 1,122,398 states that the activity of a copper catalyst can be raised considerably, while retaining a high selectivity for the hydrogenation of linolenic acid, by incorporation of small amounts of elements which are themselves active hydrogenation catalysts, such as nickel, platinum and palladium. The desired combination of higher activity and retained selectivity is obtained only if the more active element is practically completely enclosed by copper atoms. In this connection, it is known from literature that small particles of a copper-nickel alloy are covered on the outside mainly by copper atoms; see Tuul, J. and Farnsworth, M. E., Journ. Am. Chem. Soc. 33, 2247 (1961), and van de Plank, P. and Sachtler, W. M. H., Journal Catalysis 7, 300 (1967). The investigations referred to have shown that the fraction of copper atoms in the free surface of copper-nickel alloys remains largely unaffected upon variation of the compositions of the alloy within wide limits (10 to 90% of copper). This means that there is a high degree of freedom in the choice of the copper content. The abovementioned catalysts can be prepared by known methods, comprising coprecipitation and/or impregnation of a carrier, and starting from solutions containing ions of copper and of the more active element.

Nickel-copper catalysts—whether or not applied to a carrier—used for the hydrogenation of unsaturated fats and made on the basis of hydroxides, oxides or carbonates of the both metals have already been described in the Netherlands patent specification No. 2658 (of 1918), while also the British patent specification No. 642,012 mentions the use of copper-promoted nickel catalysts. The use of a predominantly copper-containing copper-nickel catalyst for the selective hydrogenation of poly-unsaturated components to mono-unsaturated ones with retention of the mono-unsaturated compounds originally present is also known from the British patent specification No. 921,033. It is also known already, from the British patent specification No. 932,991, that oils and fats can be selectively hydrogenated by means of a catalyst prepared by coprecipitation of copper and ions and ions of a metal capable of forming an alloy with copper; this second metal may be nickel.

Efforts are being directed at obtaining catalytically active copper or copper-nickel particles of minute size, in order that the catalytically active surface area may be as large as possible. However, copper is known to possess a very strong tendency to conglomerate to very large particles upon reduction. This disadvantage is shown both by catalysts made by coprecipitation and by those prepared by impregnation. In this connection it is known from literature—see Weaver, C., Chem. Ind. (London), p. 370 (1965)—that the interaction between pure metal particles and ionogenic thermostable carriers, for instance silica, is weak. Consequently, at temperatures above say, 200° C. minute metal particles will easily migrate on the surface of an inorganic carrier. This renders it impossible at elevated temperatures to prevent conglomeration and sintering of the metal particles to larger sizes. Since the mobility of the metal particles decreases as these particles grow in size, the migration of the metal particles will eventually stop when a certain (relatively large) particle size has been reached. Only if the metal is distributed homogeneously on the carrier, i.e. if the particles are spaced at the maximum distance, is the agglomeration of the particles limited to some degree.

Unlike pure metals, metal oxides adhere very strongly to ionogenic surfaces. Consequently, sintering of metal oxide particles present on the surface of a carrier is much less likely to occur, especially in the absence of water vapour. In addition, the adhesion of a metal oxide to the corresponding metal is generally good, especially if either the metal or the oxide is present as a thin layer. This implies that a thermostable metal catalyst can be obtained if that portion of the catalytically active particles which is in contact with the carrier is not reduced. In general this is difficult to realize, since the reduction rate of small metal oxide particles is determined by the rate at which nuclei of the metal phase are formed. Once a nucleus is present in a particle, nuclear growth can proceed at such a fast rate that the oxide will be rapidly and completely converted to the metal. This holds i.a. for copper oxide, which can be rapidly and completely converted to the pure metal already at temperatures below 200° C., even if the oxide is present as homogeneously distributed small particles on a thermostable carrier. Therefore, copper catalysts in general show very little resistance to high temperatures (e.g. over 200° C.).

However, nickel combines with the usual carriers, such as silica and alumina, to form compounds which are much more difficult to reduce than the nickel oxide itself. For instance, in combination with silica a hydrosilicate may be formed which can be slowly reduced only at temperatures over 600° C. The boundary layer between the nickel oxide (or nickel hydroxide) and the carrier is a compound which is reduced at higher temperatures than the nickel oxide itself. This makes it easy to prepare thermostable nickel-on-carrier catalysts.

SUMMARY OF THE INVENTION

The object of the present invention is to provide a process of hydrogenating oils with the aid of a catalyst having the following characteristics, which are favourable for the process:

(1) increased activity as compared with the known copper-containing catalyst;
(2) high thermostability and ease of regeneration;
(3) hardly any transfer of metal to the oil during the hydrogenation;
(4) good recoverability from the hydrogenated oil by filtration;
(5) reproducible catalytic properties.

The strong adhesion of copper via nickel and next via a nickel compound to a thermostable carrier can offer the possibility of very completely reducing the precipitated copper compound to metallic copper, while avoiding excessive growth of the copper particles. With full reduction of the copper, this results in a considerably more active catalyst, the copper in which does not dissolve in the oil or does so to a very limited extent only; for, metallic copper cannot be dissolved by free fatty acids in the absence of oxidative compounds.

In accordance with the invention the hydrogenation of oils which, in addition to linoleic acid, contain fatty acids of higher unsaturation, is preferably effected at a temperature between 75° and 300° C., with the aid of a catalyst formed by copper particles mainly 250 A. units or smaller in size, which, distributed homogeneously throughout the catalyst mass, adhere to the surface of a thermostable carrier material via nickel and/or nickel compounds.

More specifically, the process according to the invention is carried out with the aid of a catalyst obtained in three separate steps; in the first step a homogeneous layer of hydrated nickel oxide is precipitated onto the thermostable carrier material, in the second step an insoluble copper compound is precipitated in homogeneous distribution onto the layer of hydrated nickel oxide, and in the third step the loaded carrier material is subjected to a reductive treatment at a temperature above 150° C.

In view of the extremely small dimensions of the particles deposited on the carrier, the metals nickel and copper in atomic form can easily diffuse into each other, and form an alloy.

During the reduction the copper particles then forming adhere strongly to a nickel layer, which, in its turn, is strongly bonded to the carrier via nickel hydrosilicate or silicate that is difficult to reduce.

The catalyst to be used in the process according to the invention can be obtained by application of known precipitations, which, in accordance with the principle set forth above, are carried out in succession and are aimed at reaching a special effect, viz obtaining a better bonding and distribution of the copper on the carrier material; this effect could not be obtained for instance by reversing the order of the procedures. A catalyst mass prepared in this way appears to have a much greater thermal stability than the catalyst masses discussed in the abovementioned literature, in which copper compounds and nickel compounds are present on the carrier largely side by side, and in irregular distribution. Consequently, the reduction can without objection be carried out at temperatures considerably above 150° C. If the reduction is carried out at low temperatures, which of necessity must be done in the case of the so-called "wet reduction," to avoid undesirable side-reactions, dissolution of copper is practically unavoidable. For this reason, the reduction is preferably effected outside the oil, at a temperature higher than 200° C., in particular at temperatures between 500° C. and 1000° C. At the latter temperature, which is extremely high for copper, very complete reduction is achieved, so that there will be no or only very little dissolution of a copper compound in the oil.

Since, in spite of the use of a high reduction temperature, the copper particles remain small, the catalyst in question is particularly active. This in turn implies that, to raise the selectivity for linolenic acid, a considerably lower hydrogenation temperature may be chosen than the temperatures most commonly used for the known catalysts, which temperatures lie between 160° C. and 200° C. According to Koritala and Dutton (Journal Am. Oil Chem. Soc. 43, 556–8 (1966)) the selectivity for linolenic acid ($k_{linolenic}/k_{linoleic}$) increases with falling temperature, if the reaction mixture is sufficiently agitated. The process of this invention is therefore preferably carried out at a temperature not higher than 160° C.

Also the pressure at which the hydrogenation is carried out in apparatus normally used with nickel catalysts may be lower, e.g. atmospheric.

DETAILED DISCUSSION OF PRESENTLY PREFERRED EMBODIMENTS OF THE INVENTION

Specified in more detail, though by no means in a restrictive sense, the process according to the invention can be carried out with the aid of a catalyst the preparation of which comprises a first step in which the carrier material is suspended, in high dispersion, in a dilute solution of a nickel salt, the pH of the suspension being raised, with vigorous agitation, from a value lower than 5 to a value of approximately 7, at a rate of at most 0.1 pH unit per minute, and the loaded carrier material is separated from the liquid and washed a second step in which this material is suspended in a dilute solution of a complex copper and tartaric acid, at a pH over 6, and, with vigorous agitation, either a salt of hydroxylamine such as

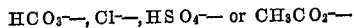

salts is injected into the suspension at a temperature of 40°–100° C., or a monosaccharide such as glucose, fructose, mannose etc. is added to the suspension at a temperature of 0° C.–40° C., next the suspension is heated to a temperature between 60° C. and 100° C., and the carrier material, now loaded with compounds of nickel and copper, is after some time separated from the liquid, washed and dried, and a third step in which the resulting mass is reduced, either with hydrogen at 150° C–250° C. in oil to be hydrogenated, or at 200° C.–1000° C. in a stream of hydrogen. Unsaturated oils which may be hydrogenated using the process of the invention include soybean oil, rape seed oil, wheat germ oil, mustard oil, etc.

The first step in the abovementioned procedure, precipitating hydrated nickel oxide onto a thermostable carrier, is described in detail i.a. in the U.S. Pat. applications Nos. 721,051 filed Apr. 12, 1968, and 858,318 filed Sept. 16, 1969. In carrying out this step it is important that the surface of the carrier material should be coated homogeneously with hydrated nickel oxide. This can be done easily by the method of the abovementioned patent applications.

Suitable carrier materials are those forms of silica which are customarily employed in fat hardening, e.g. kieselguhr, AEROSIL, or silica precipitated in situ, as also alumina, titanium dioxide, chromium oxide, magnesium oxide, or barium oxide. The amounts of nickel to be precipitated on the carrier depend entirely on the required activity and/or selectivity of the catalyst to be prepared, and may vary in relation to the amount of carrier between very wide, easily adjustable and reproducible limits of from 5% to 200% by weight.

The amount of copper to be precipitated can also be selected within very wide limits; the copper-to-nickel ratio in the catalysts may be varied from unity to one hundred. If the precipitation of the copper compound is effected in the right way, the largest of the resulting particles will be in the size range of 150–250 A. units. These dimensions do not change upon calcination and/or reduction of the precipitated copper compounds, so that the catalyst according to the invention has a very high thermostability. Reduction temperatures from 600° C. to as high as 1000° C. may be applied without objection. Owing to this, the catalyst used for the process according to the invention can also very well be regenerated at high temperatures.

Since, in the present case, the conditions under which first hydrated nickel oxide and next cuprous oxide is precipitated can be very accurately defined and controlled, catalysts with excellently reproducible catalytic properties can be prepared, with a high degree of freedom in the choice of the copper-to-nickel ratio and of the degree of loading of the thermostable carrier with catalytically active material.

The precipitation of the copper compound (cuprous oxide) is based on the well-known phenomenon that precipitation may take place at a preset pH value desired for this precipitation, if use is made of the difference in solubility which the complexed ions of the copper compound to be precipitated show in correspondence to different valencies. In that case, the ratio between the rate at which the compound to be precipitated migrates to the surface of the carrier material already loaded with hydrated nickel oxide and the rate at which this compound is generated in the solution should, however, be so adjusted that the concentration of the poorly soluble compound in the solution does not exceed the value required for the formation of isolated stable nuclei in the solution.

CERTAIN DEFINITIONS

It is therefore essential to the present method that, if the valencies of the ions of the copper to be precipitated are changed at a preset pH value and in the presence of suspended carrier material, this should be done homogeneously and gradually and under controlled conditions, so as to ensure precipitation of sufficiently small particles. "Homogeneously" as used here means that the concentrations of the ions of the old and the new valency do not depend on the location in the solution, not even if arbitrarily small unit volumes are considered; by "gradually" is understood that rate at which the concentration of ions of the old valency decreases in favour of the concentration of ions of the new valency is lower than the rate at which the compound to be precipitated migrates from the solution to the surface of the carrier material. As has been said before, this is achieved in that in the dilute solution of a complex of copper and tartaric acid, in which solution the carrier material, already loaded with hydrated nickel oxide, is present in suspended form, a reduction agent is made to react under controlled temperature conditions, with agitation, and at a preset pH value, so that precipitation of cuprous oxide takes place exclusively on the surface of the carrier material loaded with hydrated nickel oxide, said doubly loaded material being separated from the liquid and subjected to further treatments such as drying, calcination and/or reduction. "Controlled" temperature conditions as used here means that a fixed, preset temperature value, or the variation of temperature with time, is accurately adapted to the precipitation conditions desired. The entire quantity of reduction agent may be added at the start of the precipitation, e.g. if use is made of a monosaccharide. However, under certain conditions it may be preferable to inject the reduction agent into the solution in a controlled quantity, for instance if use is made of a hydroxylammonium salt. "Injecting" is here used to denote that the reduction agent is contacted with the suspension of the carrier material loaded with hydrated nickel oxide without another phase being in the immediate vicinity. In this way an extremely rapid distribution of the reduction agent throughout the agitated solution (suspension) is effected without surface tensions opposing this distribution, so that the distribtuion of ions of different valencies remains homogeneous during its gradual change.

"Controlled quantity" as used here means that the quantity of reduction agent to be injected per unit time should be accurately adapted to the reaction conditions required to produce a catalyst mass of the desired texture, i.e. consisting of small, isolated catalytically active particles of cuprous oxide on the carrier already loaded with hydrated nickel oxide.

EXAMPLES

The invention will now be elucidated by means of examples. First, examples are given of the preparation of catalysts by the process according to the invention; these will be followed by results of tests made with these catalysts.

EXAMPLE I

The preparation of a catalyst for applying the process according to the invention was carried out in two steps. First, a highly porous silica preparation was coated with hydrated nickel oxide, whereupon, in a following reaction, copper (I) oxide was deposited on the loaded carrier material.

STEP A

Loading silica with hydrated nickel oxide 124.0 g. of $Ni(NO_3)_2.6H_2O$, 50.1 g. of urea, and 59.0 g. of $NaNO_2$ were dissolved in 3 litres of demineralized water, whereupon 50 g. of silica (AEROSIL, 380 m.$^2$/g.$^{-1}$) were suspended in the solution. After that the suspension was heated at 100° C. for 18 hours with violent agitation. In this operation the pH of the suspension rose from approximately 3 to approximately 7. The loaded carrier material could then be very easily filtered off; it was washed twice with the water.

Upon drying at 120° C., 86 g. of loaded silica were obtained; its composition was 27.4% by weight of nickel and 50.3% by weight of $SiO_2$. To determine the size of the nickel particles, a sample of the material was heated at 500° C. in a stream of hydrogen for 18 hours. The nickel surface area, measured by hydrogen absorption, was then 130 m.$^2$/g. of nickel, which suggested that the particle size was at most 50 A. units. The total surface area of the material after reduction was 306 m.$^2$/g.

STEP B

Loading the material obtained in Step A with copper (I) oxide 87 g. of potassium-sodium tartrate·$4H_2O$, 33 g. of $Na_2CO_3$, and 74.0 g. of $Cu(NO_3)_2.3H_2O$ were dissolved in 1 litre of water. This solution was added to a suspension prepared by bringing 35.5 g. of the abovementioned silica loaded with nickel oxide into 2 litres of water; finally, 30.5 g. of glucose ($C_6H_{12}O_6.H_2O$) and 18.6 g. of urea were dissolved in this suspension at room temperature. The suspension was then heated at 80° C. for 18 hours, with violet agitation; during this treatment the pH of the suspension at first decreased from 8.1 to 5.9 and then rose again to 6.3. After 18 hours the carrier material, now loaded with copper and nickel, was readily filtered off and twice washed with the water.

After drying at 120° C., 55 g. of catalyst was obtained; the composition was 30.1% by weight of copper, 16.6% by weight of nickel, and 27.1% by weight of $SiO_2$. After calcination and subsequent reduction in a stream of hydrogen for 18 hours at 700° C., a copper-nickel alloy was obtained whose average particle size, as determined from the broadening of the X-ray reflections, equalled 170 A. units.

The figure is an electron-microscopic photograph of the catalyst of Example I after the reduction.

EXAMPLE II

This example relates to the preparation of a catalyst in which kieselguhr was used as the carrier material.

STEP A

Loading kieselguhr with hydrated nickel oxide 73.5 g. of $Ni(NO_3)_2.6H_2O$, 30 g. of urea, and 69 g. of $NaNO_2$ were dissolved in 3 litres of demineralized water, whereafter 30 g. of kieselguhr (15 m.$^2$/g.) was suspended in the solution. Then, the suspension was heated, with violent agitation, at 100° C. for 18 hours. During this treatment the pH of the suspension increased from approximately 3 to approximately 6. The loaded carrier material could then be very readily filtered off; it was washed twice with hot water and, without further treatment, used in step B.

STEP B

Loading the material obtained in Step A with copper (I) oxide 133.5 g. of potassium sodium tartrate.$4H_2O$, 206 g. of $NaHCO_3$, 8 g. of $Na_2CO_3.10H_2O$, and 114 g. of $Cu(NO_3)_3.3H_2O$ were dissolved in 2 litres of water. The solution was added to a suspension of the material obtained in Step A in 1 litre of water. Finally, 62 g. of glucose was dissolved in the suspension thus obtained. The suspension was heated at 100° C. for 18 hours, with violent agitation. In this operation the pH of the suspension first decreased from 8.5 to 6.0, and then increased again to a value of 7.8. After 18 hours, the carrier material, now loaded with copper and nickel, was readily filtered off and washed twice with hot water. Upon drying at 120° C., 81 g. of catalyst was obtained. The composition of this catalyst was: 34.4% by weight of copper, 16.7% by weight of nickel and 26.1% by weight of $SiO_2$. As appeared from the broadening of the X-ray reflections, the size of the copper (I) oxide particles was 200 A. units. This size was also found after reduction at 600° C. and 900° C.

The examples given below relate the hydrogenation of oils.

EXAMPLE III

The hydrogenation was carried out in a chromium-nickel steel autoclave of 1 litre capacity provided with a stirrer. The autoclave was filled with half a litre of refined soybean oil with a free fatty acid content of 0.05% by weight and an iodine number of 133. The gas-chromatographically determined fatty acid composition (total fatty acid=100%) of this starting material was as follows:

| | Percent |
|---|---|
| Linoleic acid | 54.0 |
| Linolenic acid | 7.7 |
| Oleic acid | 23.0 |
| Lauric acid | 0.1 |
| Palmitic acid | 10.6 |
| Stearic acid | 4.6 |

The oil had previously been treated with hydrogen to remove dissolved oxygen from the system. Use was made of the catalyst described in Example I, which, however, was reduced in the oil under the reaction conditions. This treatment was preceded by calcination in air at 600° C. Such an amount of catalyst was used in the experiment that 0.1% by weight of copper was present in the oil (1.4 g. of catalyst). After closure of the autoclave, the air present over the oil was removed, whereupon the contents of the autoclave were heated up to 200° C. under 5 atm. hydrogen pressure. The reaction was set going by starting the stirrer. After an induction period of 2 minutes (characteristic of "wet" reduction of the catalyst), the course of the process was followed from the pressure drop in the hydrogen storage vessel (the hydrogen pressure in the autoclave was constantly kept at 5 atm.) and the change of the refractive index of the oil. After intermediate sampling, the hydrogenation was finished by stopping the stirrer 28 minutes after the start of the hydrogen uptake; at that moment the iodine number was 102. From then onwards, no further hydrogen was taken up.

Allowance being made for the amount of soybean oil lost owing to sampling during the hydrogenation, the activity of the catalyst was found to be: 43.2 litres of $H_2$ (N.T.P.)/h./g. of Cu.

The intermediate samples and the final sample were characterized by the gas-chromatographically determined fatty acid compositions listed below:

| Minutes | 10 | 20 | 28 |
|---|---|---|---|
| Iodine number | 119 | 112 | 102 |
| Linoleic acid, percent | 47.3 | 40.7 | 33.3 |
| Linolenic acid, percent | 4.8 | 3.2 | 2.2 |
| Oleic acid, percent | 31.4 | 38.0 | 44.7 |
| Lauric acid, percent | 0.1 | 0.1 | 0.1 |
| Palmitic acid, percent | 11.4 | 11.4 | 12.6 |
| Stearic acid, percent | 5.0 | 6.6 | 7.1 |

After this "wet" reduction and subsequent filtration of the catalyst, the presence of copper and nickel could be demonstrated in the oil, the amounts found being: 3.5 mg. of Cu/kg. and 0.23 mg. of Ni/kg.

EXAMPLE IV

The experimental conditions and the starting material were equal to those in Example III.

The reaction temperature was 200° C.; the hydrogen pressure 5 at. abs., and the oil contained 0.1% by weight of Cu. Use was made of the same catalyst, with this difference, however, that after calcination at 600° C., it had first been reduced in a stream of hydrogen at 400° C. for 18 hours, and subsequently protected against oxidation by suspending it in soybean oil previously treated with hydrogen. The hydrogen uptake started immediately after the stirrer had been set going. Samples were taken at the iodine numbers: 118, 106, 96. Iodine number 96 was now reached after 10 minutes, showing that the activity was 168 litres of $H_2$ (N.T.P.)/h./g. of Cu.

The intermediate samples and the final sample were characterized by the gas-chromatographically determined fatty acid composition given below:

| Minutes | 4 | 7 | 10 |
|---|---|---|---|
| Iodine number | 118 | 106 | 96 |
| Linoleic acid, percent | 44.4 | 35.0 | 25.8 |
| Linolenic acid, percent | 5.1 | 2.9 | 1.5 |
| Oleic acid, percent | 33.5 | 43.8 | 53.9 |
| Lauric acid, percent | 0.1 | 0.1 | 0.1 |
| Palmitic acid, percent | 11.6 | 12.2 | 12.0 |
| Stearic acid, percent | 5.3 | 6.0 | 6.7 |

Reduction with hydrogen at 400° C. proved insufficient to prevent dissolution of copper and nickel in the oil. The contents of these elements amounted to 2.9 mg. of Cu/kg. and 0.29 mg. of Ni/kg.

EXAMPLE V

Here again, use was made of the catalyst prepared according to Example I; after calcination at 600° C., this catalyst was reduced in a stream of hydrogen at 600° C. for 18 hours.

Without having been in contact with atmospheric oxygen the reduced catalyst was subsequently brought into the previously degassed soybean oil to be hydrogenated. The experimental conditions including the starting material during the hydrogenation were equal to those in Examples III and IV; the temperature was 205° C. The rate of hydrogen uptake was higher than in Example IV, viz 192 litres of $H_2$ (N.T.P.)/h./g. of Cu. The hydrogenated oil was subsequently filtered from the catalyst in a hydrogen atmosphere; without being subjected to an after-purification treatment, the hardened oil now contained less than 0.1 p.p.m. of copper and nickel. The linolenic acid content of the hydrogenated oil was 30% of that of the starting material, and the linoleic acid content 58% of the original content.

EXAMPLE VI

The experimental conditions (including the starting material and the pretreatment of the catalyst) were equal to those in Example V, with the exception of the hydrogenation temperature which now equalled 185° C. The hydrogen uptake again started immediately after the stirrer had been set going. After 8 minutes the iodine number was 103; this corresponds to an activity of 188 litres of $H_2$ (N.T.P.)/h./g. of Cu, which is practically equal to the value found in Example V at a temperature of 205° C. with a catalyst pretreated in the same way.

The hardened oil, again analyzed without after-purification, was found to contain less than 0.1 p.p.m. of copper and nickel. The composition was:

| | Percent |
|---|---|
| Linoleic acid | 29.4 |
| Linolenic acid | 2.2 |
| Oleic acid | 51.5 |
| Lauric acid | 0.1 |
| Palmitic acid | 11.8 |
| Stearic acid | 5.2 |

EXAMPLE VII

The catalyst used in this example was prepared according to the procedure of Example I, but had a low nickel content. It will appear that such a catalyst is particularly suited for the selective hydrogenation of the linolenic acid present in the soybean oil. The catalyst contained 4.4% by weight of nickel, 45.2% by weight of copper and 26.5% by weight of silica. The pretreatment of the catalyst and the experimental conditions including the starting material during the hydrogenation were the same as in Example VI. After 15 minutes, an iodine number of 116 was reached; this corresponds to an activity of 56 litres of $H_2$ (N.T.P.)/h./g. of Cu.

The composition of the hardened oil was as follows:

| | Percent |
|---|---|
| Linoleic acid | 46.0 |
| Linolenic acid | 2.1 |
| Oleic acid | 35.4 |
| Lauric acid | 0.1 |
| Palmitic acid | 11.8 |
| Stearic acid | 4.7 |

The K-value $$\left( K = \frac{k_{\text{linolenic acid}}}{k_{\text{linoleic acid}}} \right)$$

determined from these figures is 5.

EXAMPLE VIII

In this example soybean oil was hydrogenated with a catalyst prepared according to Example I but containing 24.3% by weight of nickel, 23.7% by weight of copper and 27.3% by weight of silica.

The pretreatment of the catalyst and the experimental conditions and the starting material during the hydrogenation were the same as in Example VI, with the exception of the catalyst content, which was 0.05% by weight of copper.

After 10.5 minutes the iodine number was 101, from which it follows that the activity was 297 litres of $H_2$ (N.T.P.)/h./g. of Cu.

The composition of the hardened oil was:

| | Percent |
|---|---|
| Linoleic acid | 30.7 |
| Linolenic acid | 2.3 |
| Oleic acid | 49.3 |
| Lauric acid | 0.1 |
| Palmitic acid | 11.7 |
| Stearic acid | 5.9 |

EXAMPLE IX

In this example the activity of copper-nickel catalysts prepared by the process according to the invention is compared with the activities of the current copper-nickel catalysts as described in literature. The table below gives a number of hydrogenation rates measured with catalysts prepared by the method according to the invention.

The hydrogenation activity was determined for purified soybean oil at a hydrogen pressure of 5 bars. The hydrogenation rate is defined here as the average rate at which the first 25 percent of the double bonds in the oil are saturated.

| Type of catalyst, see example: | Percent of catalyst in oil | Reduction temp. (° C.) | Hydrogenation temperature (° C.) | Activity, litres $H_2$ (N.T.P.)/ h./g. Cu | Remark |
|---|---|---|---|---|---|
| I | 0.1 | 600 | 205 | 192 | |
| I | 0.1 | 600 | 185 | 188 | |
| II | 0.05 | 600 | 183 | 150 | |
| II | 0.05 | 600 | 142 | 59.1 | |
| I | 0.1 | 200 | 200 | 43.2 | Wet reduction. |
| I | 0.1 | 400 | 200 | 168 | |
| II | 0.1 | 900 | 200 | 165 | |

From the data given in the above table it can be concluded that at a hydrogen pressure of 5 bars and hydrogenation temperatures exceeding 180° C., the catalysts reduced at a sufficiently high temperature show an activity of 150–200 l. of $H_2$ (N.T.P.)/h./g. of Cu. At 142° C. the activity measured is still approximately 60 litres of $H_2$ (N.T.P.)/h./g. of Cu. British patent specification 1,122,398 mentions the activities of now current copper-nickel catalysts. The activity of catalysts containing copper as the only active component, at 185° C., a hydrogen pressure of 5 bars and 0.05% by weight of copper in soybean oil is 5.19 l. of $H_2$ (N.T.P.)/h./g. of Cu. The activity of catalysts in which 30% by weight of the copper has been replaced by nickel is more than three times as high per gram of copper than that of catalysts containing copper only. Consequently, the activity of the current copper-nickel catalysts at a hydrogenation temperature of 185° C. amounts to approximately 15 litres of $H_2$ (N.T.P.)/h./g. of Cu.

This means that the remarkable activity of the catalysts prepared by the method according to the invention is approximately ten times as high as that of the current catalysts based on copper and nickel. Even at a temperature of 140° C. and a hydrogen pressure of 5 bars, the activity of catalysts prepared by the process according to the invention is still approximately three times higher than that of the usual copper-nickel catalysts.

There are indications showing that for edible oils the rate of hydrogenation is directly proportional to the hydrogen pressure (Eldib and Albright) (Ind. Eng. Chem., 49, 825 (1957)).

If this is taken as a basis, the activity of copper-nickel catalysts according to the invention at atmospheric pressure and a hydrogenation temperature of 185° C. is still approximately twice as high as that of the current copper-nickel catalysts at 185° C. and a hydrogen pressure of 5 bars.

While the presently preferred embodiment of this invention utilizes nickel as the interlayer between the copper and the supporting material, other metals could also be used as the interlayer. Such other metals include those metals of Group VIII such as iron and cobalt, or other metals as chromium, which will form a homogeneous deposit of an insoluble compound by nucleation on the supporting material essentially in the manner described above for nickel (with, of course, the copper deposited thereupon). In some cases, use of such other metals may be preferred in order to avoid contributions to the catalytic activity from the non-selective nickel component, or for other reasons in specific catalytic processes.

What is claimed is:

1. A process for hydrogenating oil comprising contacting unsaturated oil to be hydrogenated with a catalyst mass at a temperature of between about 75° C. and 300° C., said catalyst mass consisting essentially of elementary copper particles predominantly of a size no greater than 250 A. uniformly distributed upon and adhered to the surface of a particulate thermostable carrier material via an intermediate layer of nickel particles having an average size of at most about 50 A. homogeneously distributed over the surface of said carrier material, wherein the ratio of copper to nickel in said catalyst mass is within the range of from about 1:1 to 1:100, said catalyst being prepared by the sequential steps of (a) precipitating a homogeneous layer of hydrated nickel oxide onto said thermostable carrier material, (b) precipitating a homogeneously distributed insoluble copper compound onto said hydrated nickel oxide layer and (c) reducing said carrier material so loaded with hydrogen at a temperature within the range of from about 150° C. to 1000° C.

2. The process of claim 1 wherein: in step (a) a thermostable carrier material selected from the group consisting of silica, alumina, titanium dioxide, chromium oxide, magnesium oxide and barium oxide is suspended in highly disperse form in a dilute solution of a nickel salt, the pH of the suspension is raised, under vigorous agitation, from a value lower than 5.0 to a value of about 7.0 at a rate not exceeding 0.1 pH unit per minute whereby said homogeneous layer of hydrated nickel oxide is precipitated onto said carrier material, after which the loaded carrier material is separated from the liquid and washed; and in step (b) the washed, separated, loaded carrier material from step (a) is suspended in a dilute solution of a complex of copper and tartaric acid having a pH over 6.0, after which with vigorous agitation of said suspension, a salt of hydroxylamine is injected into said suspension at a temperature of between 40° C. and 100° C. whereby said homogeneously distributed insoluble copper compound is precipitated onto said hydrated nickel oxide layer, and the loaded carrier material is separated from the solution, washed and dried.

3. The process of claim 1 wherein: in step (a) a thermostable carrier material selected from the group consisting of silica, alumina, titanium dioxide, chromium oxide, magnesium oxide and barium oxide is suspended in highly disperse form in a dilute solution of a nickel salt, the pH of the suspension is raised, under vigorous agitation, from a value lower than 5.0 to a value of about 7.0 at a rate not exceeding 0.1 pH unit per minute whereby said homogeneous layer of hydrated nickel oxide is precipitated onto said carrier material, after which the loaded carrier material is separated from the liquid and washed; and in step (b) the washed, separated, loaded carrier material is suspended in a dilute solution of a complex of copper and tartaric acid having a pH over 6.0, after which, with vigorous agitation of said suspension, a monosaccharide is added to the suspension at a temperature of between 0° C. and 40° C., the suspension is heated to a temperature of between 60° C. and 100° C., whereby said homogeneously distributed insoluble copper compound is precipitated onto said hydrated nickel oxide layer, and the loaded carrier material is separated from the solution, washed and dried.

4. The process of claim 1 wherein the unsaturated oil contains linoleic acid and linolenic acid.

5. The process of claim 4 wherein the unsaturated oil is soybean oil and hydrogenation is conducted until the linolenic acid content is reduced to 0–30 percent of the original value thereof, the linoleic acid content remains at least 50–70 percent of the original value thereof, and the iodine number of the resulting hydrogenated product is in the range 105–120.

6. The process of claim 1 wherein the hydrogenation is carried out at a temperature in the range 75° C.–160°C.

7. The process of claim 1 wherein the weight ratio of copper to nickel in the catalyst is in the range 1:1–1:100, wherein the weight ratio of nickel to carrier is in the range 5:100–200:100, and the carrier is a particulate material chosen from the group consisting of silica, alumina, titanium dioxide, chromium oxide, magnesium oxide and barium oxide.

References Cited
UNITED STATES PATENTS

| | | | |
|---|---|---|---|
| 3,240,698 | 3/1966 | Leak et al. | 260—409 |
| 3,278,568 | 10/1966 | de Jonge et al. | 260—409 |
| 2,520,440 | 8/1950 | Sanders | 260—409 |
| 2,365,045 | 12/1944 | Borkowski | 260—409 |

LEWIS GOTTS, Primary Examiner

C. L. MILLS, Assistant Examiner

U.S. Cl. X.R.

252—474